United States Patent
Priebe et al.

(10) Patent No.: US 11,466,117 B2
(45) Date of Patent: Oct. 11, 2022

(54) BINDER BASED ON PHENOLIC RESINS OF THE BENZYL ETHER TYPE, CONTAINING FREE PHENOL AND FREE HYDROXYBENZYL ALCOHOLS

(71) Applicant: ASK Chemicals GmbH, Hilden (DE)

(72) Inventors: Christian Priebe, Wülfrath (DE);
Philipp Schneider, Düsseldorf (DE);
Mark Stancliff, Herefordshire (GB);
Brian Weaver, Worcestershire (GB)

(73) Assignee: ASK Chemicals GmbH, Hilden (DE)

( * ) Notice: Subject to any disclaimer, the term of this patent is extended or adjusted under 35 U.S.C. 154(b) by 756 days.

(21) Appl. No.: 16/472,380

(22) PCT Filed: Dec. 22, 2017

(86) PCT No.: PCT/DE2017/101105
§ 371 (c)(1),
(2) Date: Jun. 21, 2019

(87) PCT Pub. No.: WO2018/113853
PCT Pub. Date: Jun. 28, 2018

(65) Prior Publication Data
US 2019/0359759 A1 Nov. 28, 2019

(30) Foreign Application Priority Data
Dec. 23, 2016 (DE) .................. 10 2016 125 700.1

(51) Int. Cl.
| | |
|---|---|
| *C08G 18/65* | (2006.01) |
| *B22C 1/22* | (2006.01) |
| *B22C 9/02* | (2006.01) |
| *B22C 9/10* | (2006.01) |
| *C08G 18/08* | (2006.01) |
| *C08G 18/18* | (2006.01) |
| *C08G 18/32* | (2006.01) |
| *C08G 18/54* | (2006.01) |
| *C08G 18/76* | (2006.01) |
| *C08K 3/36* | (2006.01) |

(52) U.S. Cl.
CPC ........ *C08G 18/6511* (2013.01); *B22C 1/2253* (2013.01); *B22C 1/2273* (2013.01); *B22C 9/02* (2013.01); *B22C 9/10* (2013.01); *C08G 18/0852* (2013.01); *C08G 18/18* (2013.01); *C08G 18/3215* (2013.01); *C08G 18/542* (2013.01); *C08G 18/7664* (2013.01); *C08K 3/36* (2013.01)

(58) Field of Classification Search
None
See application file for complete search history.

(56) References Cited

U.S. PATENT DOCUMENTS

| | | |
|---|---|---|
| 3,429,848 A | 2/1969 | Robins |
| 3,485,797 A | 12/1969 | Robins |
| 3,676,392 A | 7/1972 | Robins |
| 4,148,777 A | 4/1979 | LaBar et al. |
| 4,205,188 A | 5/1980 | Muench et al. |
| 4,268,425 A | 5/1981 | Gardikes |
| 4,540,724 A | 9/1985 | Dunnavant et al. |
| 4,546,124 A | 10/1985 | Laitar et al. |
| 4,602,069 A | 7/1986 | Dunnavant et al. |
| 4,675,375 A † | 6/1987 | Kempter |
| 4,723,592 A | 2/1988 | Laitar et al. |
| 5,447,968 A | 9/1995 | Barnett et al. |
| 6,465,542 B1 | 10/2002 | Torbus et al. |
| 8,563,662 B2 | 10/2013 | Strunk et al. |
| 2011/0015341 A1 | 1/2011 | Kowatsch et al. |
| 2011/0190444 A1 | 8/2011 | Thiel |
| 2019/0091758 A1 † | 3/2019 | Ladegourdie |

FOREIGN PATENT DOCUMENTS

| | | |
|---|---|---|
| CN | 101619125 A | 1/2010 |
| CN | 102336878 A | 2/2012 |
| DE | 102004057671 A1 | 6/2006 |
| DE | 10 2015 107 016 † | 6/2016 |
| DE | 102015107016.2 A1 | 6/2016 |
| EP | 0209020 A2 | 1/1987 |
| EP | 1137500 B1 | 3/2004 |
| JP | 5945332 A | 3/1984 |

OTHER PUBLICATIONS

Astarloa-Aierbe et al., Kinetics of Phenolic Resol Resin Formation by HPLC. III: Zinc Acetate, Polymer, vol. 40, 1999.
Zhuang, J. et al., Thermal Reactions of Diisocyanate (MD) with Phenols and Benzylalcohols: DSC Study and Synthesis of MDI Adducts, Holzforschung, vol. 47, No. 5, 1993.
Haupt, R, Structural Determination of Copolymers from the Cross-catalyzed Reactions of Phenol-Formaldeyde and Polymeric Methylenediphenyl Diisocyanate, Dissertation, Apr. 30, 2012.
Press Release, ASK Chemicals Launches Ecocure Blue Technology on the Market, Machine Translation.
Giesserei-Praxis, Chemisch hartende Formstoffe, pp. 336-337, Sep. 2007, Machine Translation.

† cited by third party

*Primary Examiner* — Jeffrey D Washville
(74) *Attorney, Agent, or Firm* — Standley Law Group LLP; Stephen L. Grant; Jeffrey S. Standley

(57) ABSTRACT

The invention relates to a binder based on phenolic resins of the benzyl ether type and isocyanate compounds having at least two isocyanate groups, containing free phenol and free hydroxybenzyl alcohols in the polyol component. The invention further relates to mold material mixtures containing the binder and to cores, molds, or risers produced with the mold material mixtures and to the use thereof in metal casting.

43 Claims, No Drawings

BINDER BASED ON PHENOLIC RESINS OF THE BENZYL ETHER TYPE, CONTAINING FREE PHENOL AND FREE HYDROXYBENZYL ALCOHOLS

INTRODUCTION

The present invention concerns a binder based on phenolic resins of the benzyl ether type and isocyanate compounds having at least two isocyanate groups, containing free phenol and free hydroxybenzyl alcohols in the polyol component in a particular ratio to one another for use in cold box methods for phenolic resins and polyurethane (PUCB methods) and/or no bake methods for phenolic resins and polyurethane (PUNB methods). The invention further relates to mold material mixtures containing the binder and to cores, molds, or risers produced with the mold material mixtures and to the use thereof in metal casting.

BACKGROUND OF THE INVENTION AND PRIOR ART IN GENERAL

The manufacture of cores and molds using the PUCB and/or the PUNB process has achieved great significance in the foundry industry. Here, two-component polyurethane systems are used to bond a refractory mold base material. The polyol component is comprised of a polyol with at least two OH-groups per molecule, the isocyanate component of an isocyanate with at least two NCO-groups per molecule. Phenol formaldehyde resins are among the polyol components used. Curing the mixture of the mold base material and binder, also referred to as the mold material mixture for brevity, takes place in the PUCB process with the aid of low boiling point tertiary amines which are passed through the mold material mixture after molding in gaseous form or as an aerosol (cf. U.S. Pat. No. 3,409,579). Usually this ensues with the help of a carrier gas, such as air, nitrogen or $CO_2$, into which at least one tertiary amine has been metered. In the PUNB process, addition of liquid tertiary amines and/or metal compounds as catalysts takes place to the mold material mixture.

Previous phenolic resins of the benzyl ether type (with reference to the pure phenolic resin, without solvent and additives), made from phenol as the sole phenolic base material and formaldehyde, typically have residual phenol concentrations of 4.0 to 18.0 weight percent (free phenol) and a concentration of free hydroxybenzyl alcohols from 4.2 to 17.9 weight percent, with the concentration of free hydroxybenzyl alcohols always being lower than that of free phenol. The hydroxybenzyl alcohols include o-hydroxybenzyl alcohol (saligenin), m-hydroxybenzyl alcohol and/or p-hydroxybenzyl alcohol (homosaligenin). If reference is made afterward to the concentration of hydroxybenzyl alcohols (regardless of whether in the singular or plural sense), this refers to the sum of ortho-, meta- and para-hydroxybenzyl alcohol.

Previous phenolic resins of the benzyl ether type (with reference to the pure phenolic resin, without solvent and additives), made from phenol and o-cresol as phenolic base materials and formaldehyde typically have residual phenol concentrations of 3.0 to 12.0 weight percent, residual cresol concentrations of 2.0 to 6.0 weight percent and hydroxybenzyl alcohol concentrations of 3.2 to 11.9 weight percent, with the hydroxybenzyl alcohol concentration always being lower than the phenol concentration.

DE 102015107016.2 teaches in the examples of Table 1 that the saligenin concentration of an exemplary phenolic resin of the benzyl ether type made of phenol and formaldehyde has a higher free phenol concentration than free saligenin. The weight ratio of phenol to saligenin or to the hydroxybenzyl alcohols respectively is always 1 to less than 1. U.S. Pat. No. 4,205,188 describes the selective manufacture of saligenin from phenol and formaldehyde in an alkaline environment. A solution extraction process is applied with an excess of phenol in order to remove the unconverted phenol again.

TASK OF THE INVENTION

The task of the invention is to provide a binder based on phenolic resins of the benzyl ether type which improves the strengths and hot strength of sand cores produced with the binder.

SUMMARY OF THE INVENTION

The task can be solved by the subject matter of the independent claims. Advantageous extensions are the subject matter of the dependent claims or are described below.

Thus the subject matter of the invention is to provide a binder containing phenolic resins of the benzyl ether type with a defined phenol or hydroxybenzyl alcohol ratio and isocyanates. Surprisingly, it was found that delaying addition of the monomers to the first addition step of the aromatic phenol ring with formaldehyde improves the strengths and tendency toward deformation. This is surprising inasmuch as for example the hydroxybenzyl alcohols (with catalytic activation) react preferably with isocyanate via the —$CH_2OH$ group and this actually leads to a chain termination. This observation is surprising, because hydroxybenzyl alcohols are considered chain terminators for the polyaddition reaction with diisocynate and, associated with this, lower strengths and diminished hot strength are to be expected.

Furthermore, the invention concerns mold material mixtures containing the binder based on phenolic resins of the benzyl ether type, refractory mold base material and isocyanates and possibly catalysts and cores, molds and risers made from the mold material mixtures after hardening. The subject matter of the invention is also the use of the cores, molds and risers for metal casting, in particular iron and aluminum casting.

DETAILED DESCRIPTION OF THE INVENTION

All conventionally used phenolic compounds are suitable for making phenolic resins of the benzyl ether type. Along with unsubstituted phenols, substituted phenols or mixtures of these can be used. The phenol compounds are preferably not substituted either in both ortho positions or in one ortho position and in the para position. The remaining carbon atoms in the ring can be substituted. The choice of substituents is not particularly limited insofar as the substituent does not adversely influence the reaction of the phenol with the aldehyde.

Examples of substituted phenols are alkyl-substituted, alkoxy-substituted, aryl-substituted and aryloxy-substituted phenols.

The basic structure of a phenolic resin of the benzyl either type has, along with —$CH_2$— linked phenol units —$CH_2$—O—$CH_2$— linked phenol units and can be represented as an example (with reference to a product implemented with only formaldehyde) as follows:

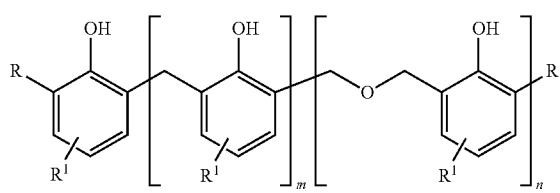

The various units are typically distributed statistically (i.e. also joined in a sequence other than that shown above). The phenol unit can also have a para bond to some extent. Here, $R^1$ is in each case independent hydrogen (in particular of m and n) or a phenolic C1-C26 alkyl substituent (saturated or unsaturated, straight-chained or branched) in an ortho, meta- or para position with respect to the phenolic hydroxy group; the sum of m and n is at least 2 and the ratio of m:n is at least 1; R is independent hydrogen, —CH$_2$OH or —CH$_2$O—R$^2$ with $R^2$=a C1 to C9 hydrocarbon. The $R^2$ group can be straight-chained or branched, saturated or unsaturated.

The aforementioned substituents have, for example, 1 to 26, preferably 1 to 15 carbon atoms. Examples of suitable phenols are o-cresol, m-cresol, p-cresol, 3,5-xylenol, 3,4-xylenol, 3,4,5-trimethylphenol, 3-ethylphenol, 3,5-diethylphenol, p-butylphenol, 3,5-dibutylphenol, p-amylphenol, cyclohexylphenol, p-octylphenol, pnonylphenol, cardanol, 3,5-dicyclohexylphenol, p-crotylphenol, p-phenylphenol, 3,5-dimethoxyphenol and p-phenoxyphenol.

Phenol itself is particularly preferred. Even more highly condensed phenols such as Bisphenol A are suitable. Furthermore, multifunctional phenols are also suitable, i.e. those having more than one phenolic hydroxyl group.

Preferred multifunctional phenols have 2 to 4 phenolic hydroxyl groups. Particular examples of suitable multifunctional phenols are pyrocatechol, resorcinol, hydroquinone, pyrogallol, phloroglucinol, 2,5-dimethylresorcinol, 4,5-dimethylresorcinol, 5-methylresorcinol, cardol or 5-ethylresorcinol. Mixtures of various mono- and multifunctional and/or substituted and/or condensed phenolic components can also be used for making the polyol component.

In one embodiment, phenols of the general Formula I

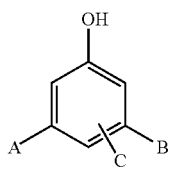

are used to make the phenol formaldehyde resin component, with A, B and C being chosen independently of one another from: a hydrogen atom, a branched or unbranched alkyl or alkenyl moiety which can have, for example, 1 to 26, preferably 1 to 15 carbon atoms, a branched or unbranched alkoxy moiety, which can have, for example, 1 to 26, preferably 1 to 15 carbon atoms, a branched or unbranched alkenoxy moiety, which can have, for example, 1 to 26, preferably 1 to 15 carbon atoms, and an aryl or alkylaryl moiety such as bisphenyls.

Along with formaldehyde, aldehydes with the following formula are also suited as a further aldehyde for making the phenolic resins of the benzyl ether type:

R—CHO where R is a carbon atom moeity with 1 to 3 carbon atoms, preferably one carbon atom. Particular examples are acetaldehyde and propionaldehyde. Formaldehyde is used with particular preference, either in its liquid form, as paraformaldehyde or trioxane.

In order to obtain phenolic resins of the benzyl ether type, preferably in at least equivalent molar quantity of aldehyde compound is used with reference to the number of moles of the phenolic compounds. The molar ratio of aldehyde compound to phenol compound preferably comprises 1.05:1.0 to 2.5:1, particularly preferably 1.1:1 to 2.2:1, most preferably 1.2:1 to 2.0:1.

According to EP 0177871 A2, aliphatic monoalcohols with one to eight carbon atoms can be added as a further reaction component. Alkoxylation is intended to give the phenol formaldehyde resins greater thermal stability and longer sand service life.

The production of the phenolic resin of the benzyl ether type takes place according to the method known to the specialist. Here the phenol and aldehyde are converted in the presence of a divalent metal ion at temperatures of preferably less than 130° C. The water formed is distilled off. A suitable entrainer can be added to the reaction mixture for this, such as toluene or xylene, or the distillation is performed at reduced pressure.

Suitable catalysts for producing phenolic resins of the benzyl ether type are salts of divalent ions of metals such as Mn, Zn, Cd, Mg, Co, Ni, Fe, Pb, Ca and Ba, in particular Zn salts. Zinc acetate is used preferably. The quantity used is not critical. Typical quantities of metal catalyst comprise 0.02 to 0.3 weight percent, preferably 0.02 to 0.18 weight percent with reference to the total quantity of phenol compound and aldehyde compound.

Such resins are described, for example, in U.S. Pat. No. 3,485,797 and EP 1137500 B1; explicit reference is made herewith to the disclosures of these, both with respect to the phenolic resins of the benzyl ether type themselves and with respect to their production. Analyses of these resins show that the weight ratio of free phenol (hydroxybenzene) to free hydroxybenzyl alcohol is always 1:less than 1.

The first reaction step of the formaldehyde addition, consisting of one mole of phenol and one mole of formaldehyde, forms hydroxybenzyl alcohols, in particular saligenin. Due to the ortho-ortho directing effect of the metal catalyst,

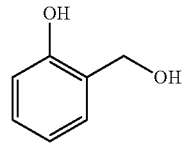

saligenin (2-hydroxybenzyl alcohol or o-hydroxybenzyl alcohol) Mw: 124.14 g/mol
is formed primarily. However, the formation of

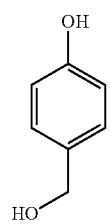

homosaligenin (4-hydroxybenzyl alcohol or p-hydroxybenzyl alcohol)

is also possible. Mixtures of the positional isomers are also possible, so the —CH$_2$—OH group can be attached at the ortho and ortho, ortho and para, and ortho, ortho and para positions. In a further embodiment, one, two or three —CH$_2$—OH groups can be etherified with a C1 to C9 monoalcohol. This monoalcohol can be straight-chained or branched, saturated or unsaturated.

The statements regarding the example of phenol also apply to the phenolic base material o-cresol and m-cresol. Possible mixtures of positional isomers for the —CH$_2$—OH group are at the ortho or para and at the ortho and para position. In a further embodiment, one or two —CH$_2$—OH groups can be etherified with a C1 to C9 monoalcohol. This monoalcohol can be straight-chained or branched, saturated or unsaturated.

If cardanol and/or cardol is used as a phenolic base material, then the —CH$_2$—OH group can be attached at the ortho and ortho, ortho and para, and ortho, ortho and para positions. In a further embodiment, one, two or three —CH$_2$—OH groups can be etherified with a C1 to C9 monoalcohol.

This monoalcohol can be straight-chained or branched, saturated or unsaturated.

Surprisingly, it was now found that a ratio greater than 1, in particular greater than 1.1 of free hydroxybenzyl alcohol to free phenol in the phenolic resin of the benzyl ether type improves the strengths and hot strength of the sand cores produced with it.

Monomeric addition products are defined as the first reaction step of a phenolic base material with formaldehyde, in which up to three hydrogens on the ring of the phenolic base material can be substituted by a —CH$_2$—OH group. Monomeric addition products based on phenol have a molar mass of 124 g/mole (hydroxybenzyl alcohol) up to 184 g/mole (phenol plus up to 3 —CH$_2$OH). Any C1- to C26-alkyl groups which are bonded on the phenolic base material and/or as an alkenyl group on an etherified —CH$_2$—OH group are not included in the molar weights given.

Preferably the weight ratio used of phenol to hydroxybenzyl alcohol is 1:greater than 1.2 to 1:30, 1:1.3 to 1:20 being more preferred, 1:1.6 to 1:15 being particularly preferred, and 1:1.8 to 1:13 being most preferred.

Preferably the weight ratio used of phenol to saligenin (o-hydroxybenzyl alcohol) is 1:greater than 1.1 to 1:25, 1:1.2 to 1:15 being more preferred, 1:1.5 to 1:10 being particularly preferred, and 1:1.8 to 1:8 being most preferred.

In particular, the weight of the phenolic resin of the benzyl ether type refers to the sum of the weights of the phenolic resins and the associated (free) monomers, where the phenolic resin is the conversion product of at least one formaldehyde compound and one phenolic compound, including conversion products analogous to polymers, such as the alkoxylation of the end groups.

The free phenol concentration with reference to the weight of the phenolic resin of the benzyl ether type preferably comprises less than 3 weight percent, in particular less than 2.5 weight percent or even less than 2 weight percent.

Consequently, the saligenin (o-hydroxybenzyl alcohol) concentration amounts to 2 to 16 weight percent, for example, or 1 to 8 weight percent, and the hydroxybenzyl alcohol concentration 2 to 26 weight percent, for example, or 1 to 13 weight percent, in each case with reference to the weight of the phenolic resin of the benzyl ether type.

The phenolic resins of the benzyl ether type can contain the required concentration of free hydroxybenzyl alcohol, in particular free saligenin, either by control during or after the formation reaction of the phenolic resin of the benzyl ether type, or by addition of hydroxybenzyl alcohol, in particular saligenin, before, after or during the formation reaction of the phenolic resin, in particular after the formation reaction of the phenolic resin.

It is also possible to control the ratio of free phenol to hydroxybenzyl alcohol, in particular to saligenin, in the phenolic resin of the benzyl ether type by removing the free phenol (preferably the free phenol) subsequently from the phenolic resin of the benzyl ether type, for example by steam distillation, azeotropic distillation or leaching with water in accordance with DIN 53704 and, for example, filtration. If desired, an addition of hydroxybenzyl alcohol, in particular saligenin, can also take place after this step.

The molar mass (HPLC Agilent 11100, RI detector, PSS SDV 5 μm precolumn, PSS SDV 5 μm column 1000 Å, PSS SDV 5 μm column 100 Å THF flow medium, column temperature 35° C., calibration vs. PSS polystyrene ReadyCal Kit [low] (Mp 266-67500 D), internal standard PSS polystyrene ReadyCal Kit [low] (Mp 266-67500 D) of the phenolic resin of the benzyl ether type without phenol and without monomeric condensation products preferably lies between 500 and 1100 g/mole, particularly preferably 550 to 1000 g/mole and most preferably 560 to 980 g/mole.

The hydroxyl number (determined according to DIN 53240) is used for further characterization of the phenolic resin of the benzyl ether type between 500 and 900 mg KOH/g, particularly preferably 550 to 850 mg KOH/g and most preferably 560 to 750 mg KOH/g.

The isocyanate component of the binder system comprises an aliphatic, cycloaliphatic or aromatic monomeric or polymeric isocyanate, preferably with an average of 2 to 5 isocyanate groups per molecule.

Depending on the desired properties, mixtures of isocyanates can also be used.

Suitable isocyanates include aliphatic isocyanates, such as hexamethylene diisocyanate, alicyclic isocyanates such as 4,4'-dicyclohexylmethane diisocyanate and dimethyl derivatives thereof. Examples of suitable aromatic isocyanates are toluene-2,4-diisocyanate, toluene-2,6-diisocyanate, 1,5-naphthalene diisocyanate, triphenylmethane triisocyanate, xylene diisocyanate and methyl derivatives thereof, as well as polymethylene polyphenyl isocyanates. Preferred isocyanates are aromatic isocyanates, with polymethylene polyphenyl polyisocyanates preferred in particular, such as technical 4,4'-diphenylmethane diisocyanate, i.e. 4,4'-diphenylmethane diisocyanate with a portion of isomers and higher homologues.

The isocyanates can also be derivatized by converting isocyanates capable of forming to bonds with one another in such a way that a portion of their isocyanate groups is derivatized to form biuret, allophanat, uretdion or carbodiimide groups. Uretdion groups having dimerization products such as MDI or TDI are interesting, for example. However, such derivatized isocyanates are preferably used as only one component along with the non-derivatized isocyanates above.

Preferably, the isocyanate is used in a quantity where the number of isocyanate groups amounts to 80 to 120% with reference to the number of free hydroxyl groups of the resin.

The isocyanate component of the binder system is used preferably as a solution in an organic solvent or a combination of organic solvents. Solvents can thus be required, for example, in order to maintain the components of the binder in a sufficiently low viscosity condition. This is necessary, among other things, in order to obtain uniform cross-linking of the refractory mold material and maintain its free-flowing characteristics.

The polyol component or isocyanate component respectively of the binder system is used preferably as a solution in an organic solvent or a combination of organic solvents. Solvents can thus be required, for example, in order to maintain the components of the binder in a sufficiently low viscosity condition. This is necessary, among other things, in order to obtain uniform cross-linking of the refractory mold material and maintain its free-flowing characteristics.

Known aromatic solvents, such as those designated as naphtha, can be used as a solvent for the polyol component. Starting from benzene, alkyl and/or alkenyl groups are substituted on the aromatic ring independent of one another, these having a chain length of C1 to C30, preferably from C1 to C20, and with particular preference from C1 to C16. Independent of one another, one to six hydrogen atoms on the benzene ring can be substituted by an alkyl and/or alkenyl group; preferably, 1 to 4, particularly preferably 1 to 3 hydrogen atoms on the ring are substituted. Irrespective of this, the alkyl or alkenyl chain can be straight or branched.

Furthermore, oxygen-rich organic solvents can be used. Dicarboxylic acid esters, glycol ether esters, glycol diesters, glycol diethers, cyclic ketones, cyclic esters (lactones), cyclic carbonates or silicic acid esters or their mixtures are particularly suitable. Dicarboxylic acid esters, cyclic ketones, silicic acid esters and cyclic carbonates are used preferably.

Typical dicarboxylic acid esters have the formula $R_1OOC-R_2-COOR_1$, in which $R_1$ groups are in each case independent of one another (in particular from the second $R_1$) and are an alkyl group with 1 to 12 carbon atoms, preferably 1 to 6, and $R_2$ is a straight-chained or branched hydrocarbon group with 1 to 7 carbon atoms. Examples are dimethyl esters of carboxylic acids with 4 to 6 carbon atoms, which are available, for example, from DuPont with the designation "dibasic ester".

Typical glycol ether esters are compounds with the formula $R_3-O-R_4-OOCR_5$, where $R_3$ is an alkyl group with 1 to 4 carbon atoms, $R_4$ is a hydrocarbon group with 2 to 4 carbon atoms and $R_5$ is an alkyl group with 1 to 3 carbon atoms, such as butyl glycol acetate; glycol ether acetates are preferred.

Typical glycol diesters correspondingly have the general formula $R_3COO-R_4-OOCR_5$, where $R_3$ to $R_5$ are as defined above and the groups are selected independently of one another in each case (such as propylene glycol diacetate). Glycol diacetates are preferred. Glycol die ethers can be characterized by the formula $R_3-O-R_4-O-R_5$, in which $R_3$ to $R_5$ are defined as above and the groups are selected independently of one another in each case (such as dipropylene glycol dimethyl ether).

Typical cyclic ketones, cyclic esters and cyclic carbonates with 4 to 5 carbon atoms are also suitable (such as propylene carbonate). The carbons can be joined in a branched or unbranched manner and can be saturated or unsaturated.

Fatty acid esters $-R_6-OOCR_7-$ are also suited with $R_7$ being a C8 to C32 hydrocarbon and $R_6$ a C1 to C9 hydrocarbon, in particular 1 to 4, such as rapeseed oil fatty acid methyl ester, oleic acid butyl ester and isopropyl esters of various fatty acids.

Silicic acid esters are also suitable in their monomeric form or as oligomers, as is known from WO 2009/130335 A2. Suitable alkyl/alkoxy silanes or alkyl/alkoxy siloxanes are, for example, esters of orthosilicic acid in which 1, 2 or 3 alcohol groups are replaced by substituted or unsubstituted hydrocarbon moieties, compounds of the formula $R^1{}_nSi(OR)_{4-n}$, in which n=1, 2 or 3, with each R group, refers to an organic group, independent of any further R groups, preferably branched or unbranched C1 to C30 alkyl or aryl, as defined correspondingly in conjunction with the first aspect. Here $R^1$ is a substituted or unsubstituted, branched or unbranched hydrocarbon group and the $R^1$ groups are, in the case of n=2 or 3, the same or different. It is preferred that the $R^1$ groups be substituted or unsubstituted, branched or unbranched C1 to C30 alkyl or substituted or unsubstituted aryl and particularly preferably substituted or unsubstituted, branched or unbranched C1 to C6 alkyl or substituted or unsubstituted C6 to C10 aryl. Unsubstituted, branched or unbranched C1 to C6 alkyl or unsubstituted phenyl is most preferred. Methyl, ethyl and propyl are in turn particularly preferred here.

Modified esters are preferred, selected from the group comprised of tetraalkoxyl silanes, monoalkyltrialkoxy silanes, dialkyldialkoxy silanes, trialkylmonoalkoxy silanes, monoaryltrialkoxy silanes, diaryldialkoxy silanes, and triarylmonoalkoxy silanes, in which the alkyl or alkoxy groups are preferably C1 to C6 alkyl groups. It is preferred that these be modified esters selected from the group comprised of methyl trimethoxy silane, methyl triethoxy silane, methyl tripropoxy silane, methyl tributoxy silane, ethyl trimethoxy silane, methyl triethoxy silane, ethyl triethoxy silane, n-propyl trimethoxy silane, n-propyl triethoxy silane, isopropyl trimethoxy silane, isopropyl triethoxy silane, vinyl trimethoxy silane, vinyl triethoxy silane, 3-glycidoxipropyl trimethoxy silane, 3-glycidoxipropyl triethoxy silane, 3,4-epoxycyclohexyl trimethoxy silane, dimethoxy dimethyl silane, diethoxy dimethyl silane, diethyl-n dimethoxy silane and diethyl diethoxy silane.

Tetraethylorthosilicate, tetrapropylorthosilicate, their mixtures and their oligomers or mixtures of oligomers are particularly preferred. Tetraethylortho- and tetrapropyl-ortho silicates or mixtures thereof are particularly preferred.

Either aromatic solvents, the aforementioned polar solvents or mixtures thereof are used as a solvent for the isocyanate. Fatty acid esters and silicic acid esters are also suitable.

The proportion of the solvent in the binder can comprise 2 to 57 weight percent, in particular 3 to 53 weight percent.

Along with the constituents already mentioned, the binder systems can contain further additives, such as silanes (for example, as per EP 1137500 B1), internal release agents such as fatty alcohols (for example, as per U.S. Pat. No. 4,602,069), drying oils (for example, as per U.S. Pat. No. 4,268,425), complexing agents (for example, as per U.S. Pat. No. 5,447,968) and additives for extending the processing time (for example, as per U.S. Pat. No. 4,540,724), flow improvers of the silicone surfactant type or mixtures thereof.

Conventional and known materials for producing cast molds and their mixtures can be used as refractory mold base material (also referred to as "mold base material" for brevity below). Examples of suitable materials are quartz sand, zircon sand, chrome ore sand, olivine, vermiculite, bauxite, fireclay and so-called artificial mold base materials, i.e. mold base materials brought into spherical or nearly spherical shape (for example, ellipsoids) by industrial shaping processes.

Examples of this are glass beads, glass granulate or artificial, spherical ceramic sands—so-called Cerabeads® but also Spherichrome®, SpherOX® or "Carboaccucast"— as well as hollow microspheres as they can be isolated, among other things, as a component of fly ash, such as aluminum silicate hollow spheres (microspheres). Mixtures of the refractory materials mentioned are also possible.

Especially preferred are refractory materials which contain more than 50 weight percent of quartz sand with the reference to the mold base material. A refractory mold base material is understood to be one which has a high melting point (melting temperature). Preferably the melting point of the refractory mold base material is greater than 600° C., more preferably greater than 900° C., particularly preferably greater than 1200° C., and most preferably greater than 1500° C.

The refractory mold base material preferably comprises more than 80 weight percent, in particular more than 90 weight percent, and particularly preferably more than 95 weight percent of the mold material mixture.

The average diameter of the refractory mold base materials generally ranges between 100 μm and 600 μm, preferably between 120 μm and 550 μm and with particular preference between 150 μm and 500 μm. The particle size can be determined, for example, by passing through a sieve in accordance with DIN ISO 3310. There is a particular preference for particle shapes with the largest extension of length having a ratio to the smallest extension of length (at right angles to one another and in each case for all spatial directions) of 1:1 to 1:5 or 1:1 to 1:3, i.e. those which are, for example, not fiber-shaped.

The refractory mold base material preferably is in a free-flowing condition, in particular in order to be able to process the inventive mold material mixture in conventional core shooters.

Tertiary amines are suitable catalysts. Volatile tertiary amines are used for the PUCB process, such as trimethyl amine ("TMA", CAS RN 75-50-3), dimethyl ethyl amin ("DMEA", CAS 75-64-9), dimethyl n-propylamine ("DMPA", CAS RN 926-63-6), dimethyl isopropylamine ("DMIPA", CAS 996-35-0), diethyl methyl amine (DEMA), triethyl amine ("TEA", CAS RN 121-44-8), tri-n-propyl amine, tri-isopropyl amien, tri-n-butyl amine and tri-isobutyl amine.

Liquid tertiary amines are used for the PUNB process. At room temperature (25° C.) this includes liquid tertiary amines as well as those which become liquid after heating to 40° C., for example, or those which are dissolved in a suitable solvent. Examples are 4-(C1-C4 alkyl) pyridines such as tris-(3-dimethylamino)propylamine and isoquinoline. Aryl pyridines such as phenyl pyridine, pyridine, acridine, 2-methoxypyridine, pyridazine, 3-chloropyridine, quinoline, N-methylimidazole, N-ethylimidazole, 4,4'-dipyridine, 4-phenylpropylpyridine, 1-methylbenzimidazole and 1,4-thiazine.

Furthermore, the invention concerns a method for producing mold material mixtures, comprising
(a) mixing of refractory mold base materials with the inventive binder in a quantity of 0.2 to 12 weight percent, preferably 0.3 to 13 weight percent, particularly preferably 0.4 to 12 weight percent with reference to the quantity of refractory mold base materials and a catalyst, added at the same time (in the PUNB process) or separately later (in the PUCB process) to obtain a mold material mixture;
(b) placement of the mold material mixture obtained in Step (a) in a mold tool;
(c) possible addition of the catalyst added separately later (PUCB) and hardening of the mold material mixture in the mold tool with the inventive catalyst to obtain a core or a cast mold; and
(d) subsequent separation of the core or the cast mold from the tool and possibly further hardening.

For the production of the mold material mixture, the components of the binder system can first be combined and then added to the refractory mold base material. However, it is also possible to add the components of the binder to the refractory mold base material at the same time or one after the other in any sequence.

Conventional methods can be used to obtain a uniform mixture of the components for the mold material mixture. The mold material mixture can also contain other conventional constituents, such as iron oxide, ground flax fibers, sawdust granulate, pitch, flow improvers of the silicon surfactant type and refractory metals.

According to the invention, curing can ensue by the PUCB or PUNB method. In the case of the PUCB process, for hardening, a low boiling point tertiary amine is passed through the shaped mold material mixture using an inert carrier gas in gaseous form or as an aerosol. There is no addition of a separate catalyst. All known cold box amine catalysts can be used.

In the case of the PUCB process, the amine or metal catalyst can already be dissolved in the binder or mixed with the refractory material as a separate component, with the added amount comprising approximately 0.1 weight percent to approximately 5 weight percent with reference to the mold material mixture.

The mold bodies produced according to this method can have any conventional shape employed in foundries. In one preferred embodiment, the mold bodies are present in the shape of casting molds, cores or risers. These are distinguished by high mechanical stability.

The invention further concerns the use of this mold body for metal casting, in particular casting of iron and aluminum.

The invention is described below in more detail based on preferred embodiments or experimental examples respectively, without being limited to these.

EXPERIMENTAL EXAMPLES

Components Used

All percentage information is in weight percent.

Phenolic resin of the benzyl ether type (o-cresol/phenol/cardanol copolymer) which is characterized by the following analytical figures:

Molecular weight (Mw) approximately 900 molecular weight g/mole, hydroxyl number approximately 560 mg KOH/g, free phenol concentration 1.8%, saligenin concentration 3.8%.

ECOCURE 370/5 PART 1—phenolic resin of the benzyl ether type, partially etherified with n-butanol, supplied by ASK-Chemicals GmbH, free phenol concentration 4.5%, saligenin concentration 3.8%.

ISOCYANATE COMPONENT: a homogeneous mixture of 80% Lupranat M 20 S and 20% RME

KATALYSATOR 706—dimethylpropyl amine, supplied by ASK-Chemicals GmbH

Quartz sand H 32—supplied by Quarzwerke GmbH

MIRATEC DC 3—water-based laminar flow, flow time 12 sec/4 mm cup, supplied by ASK-Chemicals GmbH LUPRANAT M 20 S: polymeric MDI, functionality 2.6, supplied by BASF SE DBE—dimethyl ester mixture of C4-C6 dicarboxylic acids, supplied by DuPont RME—distilled rapeseed oil fatty acid methyl ester, supplied by Cargill Silan 2201 EQ—50% ureidosilane in methanol, supplied by Evonik Industries Phenol—supplied by Sigma Aldrich o-Hydroxybenzyl alcohol—supplied by Sigma Aldrich p-Hydroxybenzyl alcohol—supplied by Sigma Aldrich Measurement of the Phenol and Saligenin Concentration The phenol and saligenin concentration was determined by gas chromatography as described below.

Method Description:

Calibration: internal standard method, seven-point calibration for each substance to be determined Internal standard: 2,4,6 trimethylphenol p.a.

Standard substances: phenol p.a. and saligenin (o-hydroxybenzyl alcohol) p.a.

Gas chromatograph: Agilent 7890 Plus, with FID, capillary column, autosampler and Agilent ChemStation Instrument parameters:

Input system: split/splitless injector, split 50:1 (79,9. l/min) after 2 minutes run time 20 ml/min Temperature: 280° C.

Carrier gas: hydrogen 5.0, flow 1 ml/min, constant flow method

Capillary column: HP-5MS, HP 19091S-105, length 50 m, diameter 0.2 mm, film 0.33 µm Temperature program: 60° C. for 1.5 min; 4.0° C./min until 140° C., maintain 0 min, then 20° C./min up to 325° C., maintain 6 min 325° C.

Detector: FID, temperature 320° C.

Combustible gas: hydrogen 5.0 at 20 ml/min, synthetic air 5.0 at 350 ml/min, make up gas: nitrogen 5.0 at 25 ml/min Autosampler: 10 µl GC syringe, 1 µl injection, fast injection mode Quantification: Agilent Chemstation standard setting, internal standard method, results information in weight percent

|  | Comparison | According to the invention | | | | | |
|---|---|---|---|---|---|---|---|
|  | A1 | B1 | B2 | B3 | B4 | B5 | B6 |
| Phenolic resin, benzyl ether type | 50 | 50 | 50 | 50 | 50 | 50 | 50 |
| Phenol |  | 2 |  |  |  |  |  |
| DBE | 23.75 | 24.75 | 23.75 | 22.75 | 21.75 | 20.75 | 22.75 |
| RME | 23.75 | 24.75 | 23.75 | 22.75 | 21.75 | 20.75 | 22.75 |
| Silan 2201 EQ | 0.5 | 0.5 | 0.5 | 0.5 | 0.5 | 0.5 | 0.5 |
| o-Hydroxybenzyl alcohol |  |  | 2 | 4 | 6 | 8 |  |
| p-Hydroxybenzyl alcohol |  |  |  |  |  |  | 4 |

Table 1 shows the polyol components produced based on the phenolic resin of the benzyl ether type; numerical information represents weight percent.

|  | Comparison | According to the invention | | | | |
|---|---|---|---|---|---|---|
|  | A2 | B7 | B8 | B9 | B10 | B11 |
| ECOCURE 370/5 PART 1 | 100 | 98 | 96 | 94 | 92 | 96 |
| o-Hydroxybenzyl alcohol |  | 2 | 4 | 6 | 8 |  |
| p-Hydroxybenzyl alcohol |  |  |  |  |  | 4 |

Table 2 shows the polyol components produced based on ECOCURE 370/5 PART 1; numerical information represents weight percent.

Determination of Strengths in N/Cm²

In a Hobart mixer, a sand mixture comprised of quartz sand H 32 plus 0.60% of the aforementioned binder compositions (in each case individually for the examples A1 to B11) and 0.60% ISOCYANATE COMPONENT was mixed for two minutes until homogeneous.

This sand mixture was transferred to a Roeper H 1 core shooter and in each case two cores with a dimension (l×w×h) of 220 mm×22.4 mm×22.4 mm were put in the mold with a closing pressure of 4 bar using compressed air. The sand was hardened using CATALYST 706 (0.5 ml, gassing time 10 sec at 2 bar purging pressure). After hardening, the core was removed and the strength was determined after 15 seconds or 30 seconds respectively using a Multiserw bending device.

To determine the hot strength, a 10-minute old core was immersed in the MIRATEC DC 3 flow for 4 seconds and dried for 30 minutes at 150° C. in a circulating air dryer. After 30 minutes at 150° C., the core was removed and the bending strength was tested immediately in the Multiserw unit while hot.

| Bending strength in N/cm² | | | | | | | |
|---|---|---|---|---|---|---|---|
|  | Comparison | According to the invention | | | | | |
|  | A1 | B1 | B2 | B3 | B4 | B5 | B6 |
| Immediate, 15 sec | 92 | 96 | 107 | 117 | 132 | 144 | 127 |
| Immediate, 30 sec | 100 | 105 | 111 | 126 | 141 | 160 | 137 |
| Hot strength | 95 | 142 | 167 | 154 | 170 | 169 | 173 |

Table 3 shows the bending strengths determined in N/cm²

|  | Comparison | According to the invention | | | | |
|---|---|---|---|---|---|---|
|  | A2 | B7 | B8 | B9 | B10 | B11 |
| Immediate, 15 sec | 98 | 108 | 115 | 122 | 132 | 114 |
| Immediate, 30 sec | 103 | 114 | 124 | 143 | 144 | 124 |
| Hot strength | 102 | 131 | 136 | 148 | 121 | 146 |

Table 4 shows the bending strengths determined in N/cm² using ECOCURE 370/5 PART 1 as an example.

Both tables have results show that the addition of o-hydroxybenzyl alcohol or p-hydroxybenzyl alcohol increases the immediate and hot strengths. A ratio of free phenol to free saligenin (A1 and A2 respectively) which is approximately the same shows lower immediate and hot strengths.

The invention claimed is:

1. A binder for hardening mold material mixtures comprising:
   a polyol component, with the polyol component comprising a phenolic resin of the benzyl ether type;
   a isocyanate component comprised of one or more isocyanate compounds with at least 2 isocyanate groups per molecule;
   wherein the binder contains less than 3 weight percent of free phenol;
   wherein the binder has a saligenin (o-hydroxybenzyl alcohol) content in the range of 1 to 16 weight percent;

wherein the binder has a hydroxybenzyl alcohol content in the range of 1 to 26 weight percent, in each case with reference to the weight of the phenolic resin of the benzyl ether type, and the binder is further characterized by at least one of the following:
a) the binder contains free phenol and free hydroxybenzyl alcohol, and the weight ratio of free phenol to free hydroxybenzyl alcohol is 1:>1.2; and
b) the binder contains free phenol and free saligenin, and the weight ratio of free phenol to free saligenin is 1:>1.1.

2. A mold material mixture comprising:
a refractory mold base material; and
a binder, wherein the binder comprises:
a polyol component, with the polyol component being a phenolic resin of the benzyl ether type; and
an isocyanate component comprised of one or more isocyanate compounds with at least 2 isocyanate groups per molecule;
wherein, in each case with reference to the weight of the phenolic resin of the benzyl ether type:
the binder contains less than 3 weight percent of free phenol; and
the binder contains saligenin (o-hydroxybenzyl alcohol) in the range of 1 to 16 weight percent; and
the binder contains hydroxybenzyl alcohol in the range of 1 to 26 weight percent; and
the binder is further characterized by at least one of the following:
a) the binder contains free phenol and free hydroxybenzyl alcohol, and the weight ratio of free phenol to free hydroxybenzyl alcohol is 1:>1.2; and
b) the binder contains free phenol and free saligenin and the weight ratio of free phenol to free saligenin is 1:>1.1.

3. The binder of claim 1, in which the weight ratio of free phenol to free hydroxybenzyl alcohol is from 1:>1.2 to 1:30.

4. The binder of claim 1, in which the weight ratio of free phenol to free saligenin is from 1:>1.1 to 1:25.

5. The binder of claim 1, wherein, with reference to the weight, the phenolic resin of the benzyl ether type contains less than 2.5 weight percent free phenol.

6. The binder of claim 1, further comprising, in the phenolic resin of the benzyl ether type, at least one of: free cresol, free cardanol and free cardol.

7. The binder of claim 1, wherein the phenolic resin of the benzyl ether type has a hydroxyl number according to DIN 53240 of 500 to 900 mg KOH/g.

8. The binder of claim 1, wherein the phenolic resin of the benzyl ether type has an average molecular weight, measured as weight average according to DIN 5567-1 using GPC, of 500 to 1100 g/mol without phenol and monomeric addition products.

9. The binder of claim 1, wherein the polyol component comprises, as a solvent, an aromatic solvent and at least one of: dicarboxylic acid esters and fatty acid esters.

10. The binder of claim 1, comprising, independently of one another:
8 to 70 weight percent phenolic resin of the benzyl ether type;
13 to 78 weight percent isocyanate compounds; and
2 to 57 weight percent solvent for the phenolic resin of the benzyl ether type and the isocyanate compounds.

11. The mold material mixture of claim 2, wherein the refractory mold base material is selected from the group consisting of: olivine, fireclay, bauxite, aluminum silicate hollow spheres, glass beads, glass granulate, zircon sand, chrome ore sand, quartz sand, synthetic ceramic mold base materials and silicon dioxide, and mixtures thereof.

12. A method for producing a mold body as a cast mold or core, comprising the steps of:
providing a mold material mixture according to claim 2;
introducing the mold material mixture or its components into a mold tool;
hardening the mold material mixture in the mold tool with at least one tertiary amine in order to obtain a self-supporting mold body; and
separating the self-supporting mold body from the tool and, optionally, further hardening, resulting in a cured mold body.

13. The method according to claim 12, wherein the mold material mixture is provided as a kit in which the binder components are separated from one another, with at least the isocyanate compounds as one component and at least the phenolic resin of the benzyl ether type as a further component.

14. The method according to claim 12, in which the tertiary amine is selected from the group consisting of: trimethylamine (TMA), dimethylethylamine (DMEA), dimethyl-n-propylamine (DMPA), dimethylisopropylamine (DMIPA), diethylmethylamine (DEMA), triethylamine (TEA), tri-n-propylamine, triisopropylamine, tri-n-butylamine, triisobutylamine, 4-(C1-C4 alkyl) pyridines, tris(3-dimethylamino)propylamine, isoquinoline, aryl pyridines such as phenylpyridine, pyridine, acridine, 2-methoxypyridine, pyridazine, 3-chloropyridine, quinoline, N-methylimidazole, N-ethylimidazole, 4,4'-dipyridine, 4-phenylpropylpyridine, 1-methylbenzimidazole and 1,4-thiazine, and mixtures thereof.

15. A kit for manufacturing a mold material mixture, comprising a binder and a refractory mold base material, wherein the kit comprises, separate from one another:
an isocyanate component, comprising one or more isocyanate compounds with at least 2 isocyanate groups per molecule; and
a phenolic resin component, comprising a phenolic resin of the benzyl ether type, and, wherein with reference to the weight of the phenolic resin of the benzyl ether type:
the binder comprises free phenol at less than 3 weight percent;
the binder comprises saligenin (o-hydroxybenzyl alcohol) in the range of 1 to 16 weight percent; and
the binder comprises hydroxybenzyl alcohol in the range of 1 to 26 weight percent;
wherein the binder is further characterized by at least one of the following features:
a) the binder contains free phenol and free hydroxybenzyl alcohol, and the weight ratio of free phenol to free hydroxybenzyl alcohol amounts to 1:greater than 1.2; and
b) the binder contains free phenol and free saligenin, and the weight ratio of free phenol to free saligenin amounts to 1:greater than 1.1.

16. The mold material mixture of claim 2, in which the weight ratio of free phenol to free hydroxybenzyl alcohol is from 1:>1.2 to 1:30.

17. The mold material mixture of claim 2 in which the weight ratio of free phenol to free saligenin is from 1:>1.1 to 1:25.

18. The mold material mixture of claim 2, wherein with reference to the weight, the phenolic resin of the benzyl ether type contains less than 2.5 weight percent free phenol.

19. The mold material mixture of claim 2, further comprising, in the phenolic resin of the benzyl ether type, one or more of free cresol, free cardanol and free cardol.

20. The binder of claim 1, in which the weight ratio of free phenol to free hydroxybenzyl alcohol is from 1:1.3 up to 1:20.

21. The binder of claim 1, in which the weight ratio of free phenol to free hydroxybenzyl alcohol is from 1:1.6 up to 1:15.

22. The binder of claim 1, in which the weight ratio of free phenol to free hydroxybenzyl alcohol is from 1:1.8 up to 1:13.

23. The binder of claim 1, in which the weight ratio of free phenol to free saligenin is from 1:1.2 to 1:15.

24. The binder of claim 1, in which the weight ratio of free phenol to free saligenin is from 1:1.5 to 1:10.

25. The binder of claim 1, in which the weight ratio of free phenol to free saligenin is from 1:1.8 to 1:8.

26. The binder of claim 1, wherein, with reference to the weight, the phenolic resin of the benzyl ether type contains less than 2 weight percent free phenol.

27. The binder of claim 1, wherein the phenolic resin of the benzyl ether type has a hydroxyl number according to DIN 53240 of 550 to 850 mg KOH/g.

28. The binder of claim 1, wherein the phenolic resin of the benzyl ether type has a hydroxyl number according to DIN 53240 of 560 to 750 mg KOH/g.

29. The binder of claim 1, wherein the phenolic resin of the benzyl ether type has an average molecular weight, measured as weight average according to DIN 5567-1 using GPC, of 550 to 1000 g/mol without phenol and monomeric addition products.

30. The binder of claim 1, wherein the phenolic resin of the benzyl ether type has an average molecular weight, measured as weight average according to DIN 5567-1 using GPC, of 560 to 980 g/mol without phenol and monomeric addition products.

31. The binder of claim 9, wherein the aromatic solvent is present at less than 10 weight percent.

32. The binder of claim 1, comprising, independently of one another:
   10 to 62 weight percent phenolic resin of the benzyl ether type;
   17 to 70 weight percent isocyanate compounds; and
   3 to 53 weight percent solvent for the phenolic resin of the benzyl ether type and the isocyanate compounds.

33. The mold material mixture of claim 2, in which the weight ratio of free phenol to free hydroxybenzyl alcohol is from 1:1.3 to 1:20.

34. The mold material mixture of claim 2, in which the weight ratio of free phenol to free hydroxybenzyl alcohol is from 1:1.6 to 1:15.

35. The mold material mixture of claim 2, in which the weight ratio of free phenol to free hydroxybenzyl alcohol is from 1:1.8 to 1:13.

36. The mold material mixture of claim 2 in which the weight ratio of free phenol to free saligenin is from 1:1.2 to 1:15.

37. The mold material mixture of claim 2 in which the weight ratio of free phenol to free saligenin is from 1:1.5 to 1:10.

38. The mold material mixture of claim 2 in which the weight ratio of free phenol to free saligenin is from 1:1.8 to 1:8.

39. The mold material mixture of claim 2, wherein with reference to the weight, the phenolic resin of the benzyl ether type contains less than 2 weight percent free phenol.

40. The mold material mixture of claim 2, wherein the phenolic resin of the benzyl ether type has a hydroxyl number according to DIN 53240 of 500 to 900 mg KOH/g.

41. The mold material mixture of claim 2, wherein the phenolic resin of the benzyl ether type has an average molecular weight, measured as weight average according to DIN 5567-1 using GPC, of 500 to 1100 g/mol without phenol and monomeric addition products.

42. The mold material mixture of claim 2, wherein the polyol component comprises, as a solvent, an aromatic solvent and at least one of: dicarboxylic acid esters and fatty acid esters.

43. The mold material mixture of claim 2, wherein the binder comprises, independently of one another:
   8 to 70 weight percent phenolic resin of the benzyl ether type;
   13 to 78 weight percent isocyanate compounds; and
   2 to 57 weight percent solvent for the phenolic resin of the benzyl ether type and the isocyanate compounds.

* * * * *

UNITED STATES PATENT AND TRADEMARK OFFICE
CERTIFICATE OF CORRECTION

PATENT NO. : 11,466,117 B2
APPLICATION NO. : 16/472380
DATED : October 11, 2022
INVENTOR(S) : Christian Priebe et al.

It is certified that error appears in the above-identified patent and that said Letters Patent is hereby corrected as shown below:

In the Specification

Column 11, Line 19, please delete "(79,9.1/min)" and insert -- (79.9 ml/min) --.

Signed and Sealed this
Twenty-second Day of November, 2022

Katherine Kelly Vidal
*Director of the United States Patent and Trademark Office*